United States Patent Office 3,536,534
Patented Oct. 27, 1970

3,536,534
FUEL CELL WITH NONPOROUS HYDROGEN ELECTRODE AND HYDROGEN GENERATING MEANS
Hajime Shiratori, Sagamihara-shi, Tamotsu Shirogami, Yamato-shi, Junji Koezuka, Yokohama-shi, and Kenichi Minamiyama, Tokyo, Japan, assignors to Tokyo Shibaura Electric Co., Ltd., Kawasaki-shi, Japan, a corporation of Japan
Filed Oct. 9, 1967, Ser. No. 673,672
Claims priority, application Japan, Oct. 12, 1966,
41/66,588, 41/66,590
Int. Cl. H01m 27/06
U.S. Cl. 136—86                      4 Claims

ABSTRACT OF THE DISCLOSURE

A fuel cell which includes a hydrogen chamber to contain hydrogen gas, a nonporous electrode carrying a layer of catalyst, an electrolytic solution chamber filled with an electrolytic solution, a porous electrode disposed in parallel with the nonporous electrode and carrying a layer of catalyst, an oxygen chamber having a flow path for flow of oxygen gas, and a hydrogen gas generator for generating hydrogen gas by decomposition of methanol to feed the hydrogen gas thus generated to the hydrogen chamber. An amount of oxygen gas is flowed through the oxygen chamber to feed oxygen to the electrolytic solution through the porous electrode in an excess amount required for establishing an electrode reaction, and the remaining oxygen gas entrains moisture produced by the electrode reaction to remove the moisture from the electrolytic solution. The fuel cell is heated by combustion gas obtained from the combustion of the carbon monoxide produced by the decomposition of methanol.

---

Figure 1:
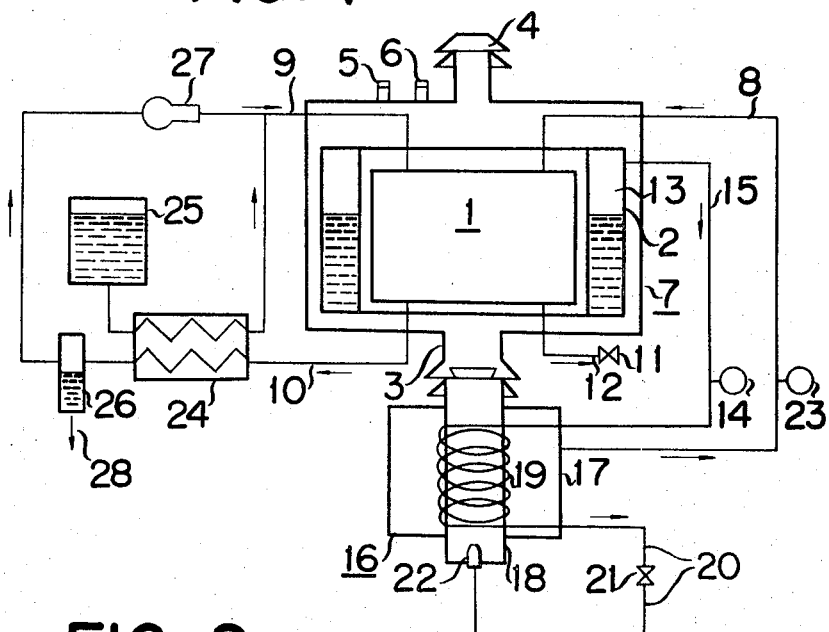

This invention relates to a fuel cell using hydrogen as fuel, and particularly to a hydrogen-oxygen fuel cell using as fuel the hydrogen obtained by decomposing methanol.

It is already known that hydrogen is the most useful for a fuel cell which yields electrical power with the direct way of energy conversion through the electrochemical oxidation of fuel material. In general, a hydrogen-oxygen fuel cell consists of an electrolytic solution such as an aqueous solution of alkali, a pair of porous electrodes each carrying catalytic material which are disposed opposite to each other with an electrolytic solution lying between them, and two chambers formed on the outside of the electrode assembly to hold hydrogen and oxygen or air respectively. The hydrogen gas enclosed within the hydrogen chamber with atmospheric or increased pressure permeates through the porous electrode in contact therewith, causing the known electrode reaction with the electrolytic solution. On the other hand, the oxygen gas filled into the oxygen chamber with atmospheric or increased pressure passes through the porous electrode exposed thereto, similarly causing a known reaction at the side of the electrolytic solution. As a result, an electromotive force is created between the electrodes, and at the same time water is produced in the electrolytic solution.

For the continuous operation of the hydrogen-oxygen fuel cell, it is required that hydrogen and oxygen are additionally supplied in sufficient amounts to make up for consumption and also that the water produced by the electrode reaction is removed from the electrolytic solution so as to maintain the electrolyte at the proper constant concentration. With the prior art fuel cell, removal of the water produced is carried out either by additionally feeding an electrolytic solution of the prescribed concentration in order to cause the diluted electrolytic solution to overflow or circulating part of the electrolytic solution through a concentrating mechanism disposed outside of the cell. However, since a practical fuel cell consists of a plurality of unit element cells to compensate for the low electromotive force available from each of them, the overflow of an electrolytic solution from a unit element cell is likely to cause shorting with other unit element cells. On the other hand, the circulation of the electrolytic solution for concentration will require large equipment for concentration and circulation and a complicated transfer system between the unit element cells and the concentrating mechanism, which will also lead to difficulties or failures in the operation of the cell as a whole. Moreover, the provision of such transfer channel for circulation will extend the distance between the electrodes, resulting in reduced output voltage due to increased internal resistance between the electrodes.

The present invention provides a fuel cell which comprises a hydrogen chamber to hold fuel hydrogen gas, an oxygen chamber to contain oxygen gas, an electrolytic solution chamber located between the hydrogen chamber and oxygen chamber to hold said solution, a hydrogen electrode carrying catalytic material which partitions the hydrogen chamber from the electrolytic solution chamber and is capable of penetrating hydrogen gas through the electrode, and oxygen electrode carrying catalytic material which partitions the oxygen chamber from the electrolytic solution chamber and has the surface thereof facing the oxygen chamber rendered water repellent and is also capable of permeating moisture through the electrode, a hydrogen gas generating mechanism to evolve hydrogen gas by catalytic decomposition of methanol for supply to the hydrogen chamber, a means to feed oxygen gas to the oxygen chamber, and a means to remove, from the oxygen chamber to the outside of the cell, the unreacted portion of the oxygen gas along with moisture which permeates through the electrode.

In the novel fuel cell according to this invention, the water produced in the electrolytic solution with the progress of the electrode reaction permeates through the porous oxygen electrode and is entrained with the oxygen gas flowing through the oxygen chamber and then removed from the cell. Therefore, the electrolytic solution is always maintained at the proper constant concentration without the necessity of circulating it for additional concentration. The circulation of oxygen gas is far easier than that of the electrolytic solution for concentration. Moreover, if the moistened gas from the cell is reused after dehumidifying, there is no loss of oxygen gas.

Figure 2:
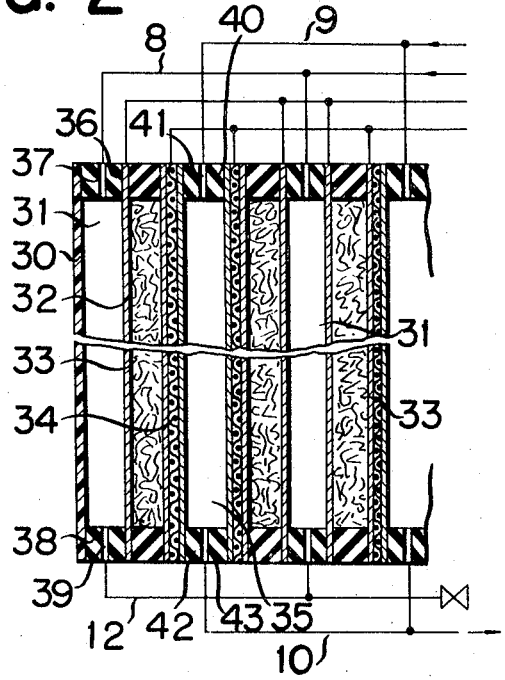

In the drawing:

FIG. 1 is a diagrammatical longitudinal sectional view of a fuel cell according to the present invention; and FIG. 2 is an enlarged longitudinal partial section of the cell body used in the cell of FIG. 1.

Referring to FIG. 1, the cell body 1 is housed in a hermetic heat retaining vessel 2. This vessel 2 is contained in a heating tank 7 having a gas inlet 3 on the underside, a gas outlet at the top and a pair of output terminals 5 and 6 to lead out electrical outputs. The cell body 1 has a pipe line 8 to supply fuel hydrogen gas thereto, a pipe line 9 to supply oxygen gas thereto, a pipe line 10 to remove excess oxygen gas therefrom and a pipe line 12 provided with a valve 11 at the end to remove the air in the hydrogen chamber; these pipe lines being fitted in a manner to penetrate through the walls of the heat retaining vessel 2 and the heating device 7. The heat retaining vessel 2 has a methanol chamber 13 positioned at the outside of the cell body 1. There is also installed a pipe line 15 open at a point above the level of the methanol contained in the methanol chamber 13, the pipe line being also provided with a pressure gauge 14 to check the pressure with which methanol vapour released are conducted to a means 16 for generating hydrogen gas.

The hydrogen generator 16 consists of an airtight cylindrical shell 17, a cylindrical body 18 disposed coaxially with the shell 17 in a manner to penetrate therethrough, and a pipe 19 wound spirally about the circumferential surface of the cylindrical body 18. The spiral pipe 19 consists of a material permitting hydrogen gas to permeate through the wall thereof, for example, palladium or alloys of palladium and copper, silver or gold. The inner surface of the spiral pipe 19 carries a catalyst of palladium black, for thermal decomposition of methanol and the outer surface thereof has a layer of catalyst to convert nascent hydrogen into a molecular form such as mixed black containing palladium and elements from Group VIII in the Periodic Table. One end of the spiral pipe 19 communicates with said pipe line 15 to transfer methanol vapours, and the other end thereof is connected to a pipe line 20 to lead carbon monoxide remaining in the spiral pipe 19 to the outside of the system. The pipe line 20 is preferably connected through a valve 21 ot a burner 22 disposed within the cylindrical body 18 to heat the cylindrical body 18 and the heating tank 7 by burning the carbon monoxide. On the other hand, the interior of the shell 17 communicates with one end of the pipe line 8, provided with a pressure gauge 23 so as to feed the hydrogen gas held therein to the cell body 1.

To the pipe line 9 supplying oxygen gas to the cell body 1 there is connected through a heat exchanger 24 a vessel 25 of oxygen gas, or preferably liquefied oxygen. On the other hand, the pipe line 10 is connected to the heat exchanger 24 to condense the water vapours contained in the moistened oxygen gas flowing through the interior thereof, then to a trap 26 to remove condensed water from the gas and finally to the pipe line 9 through a blower 27 to supply dehumidified oxygen gas to the pipe line 9 at the desired flow rate. There is also provided a pipe line 28 to carry outside of the system the water separated from the oxygen gas in the trap 26.

As illustrated in FIG. 2, the cell body 1 consists of a plurality of, for example, thirteen element cells housed in a case 30. The element cell comprises a hydrogen chamber 31, a non-porous hydrogen electrode 32, an electrolytic solution chamber 33, a porous oxygen electrode 34 and an oxygen chamber 35 arranged in the order mentioned. Another succeeding element cell disposed adjacent to the above-mentioned element cell is of exactly the same construction, except for the reversed order of arrangement, but the hydrogen chamber 31 and oxygen chamber 35 of each element cell are respectively used in common to the cells on both sides thereof. The individual hydrogen chambers 31 are connected to said hydrogen supplying pipe line 8 through a bore 37 of an insulating packing 36 provided at the top of each of them. The bottom of said hydrogen chamber is connected similarly through a penetrating hold 39 of an insulating packing 38 to the pipe line 12 having a valve 11 which is normally closed. On the other hand, each oxygen chamber 35 is connected at the top to the oxygen supplying pipe line 9 through a bore 41 of an insulating packing 40 provided thereto and at the bottom to the pipe line 10 to discharge excess oxygen through a bore 43 of an insulating packing 42 provided thereto.

The non-porous hydrogen electrode 31 consists of a substrate extremely thin, for example, 0.01 to 0.05 mm. which is of palladium alloys consisting of palladium, and copper, silver or gold which is capable of allowing hydrogen gas to permeate therethrough. The substrate carries layers of palladium black catalyst deposited on the one side thereof facing to the hydrogen chamber, and layers of mixed black catalyst containing palladium and platinum and/or rhodium deposited on the other side. This hydrogen electrode permits the permeation of hydrogen gas and satisfactorily catalyzes the electrode reaction between hydrogen and the electrolytic solution.

The oxygen electrode 35 consists of a screen of alkali-resistant material having pores which have a diameter large enough to allow moisture to pass. The screen may be of a nickel screen having openings of 0.08 to 0.3 mm., particulate catalysts deposited on said screen which are composed of blacks of element from Group VIII in the Periodic Table or mixtures of these blacks and carbon, and has a porous film of polytetrafluoroethylene (P.T.F.E.) formed on the side facing to the oxygen chamber. The porous P.T.F.E. film may be prepared, for example, by spraying over the screen a dispersion liquid which includes fine particles of P.T.F.E. in water at the rate of 0.05 to 0.5 mg./cm.$^2$, followed by sintering at temperatures of about 400° C. The P.T.F.E. film thus formed will allow moisture to pass in restricted proportions due to its high water repellency. If a film deposited on the screen is composed of other substances than P.T.F.E., for example, polyethylene, polypropylene, and paraffin, the film tends to be decomposed or denatured by alkali and/or heat when the full cell is used under the conditions that the film is brought into contact with the alkaline electrolytic solution at relatively elevated temperatures.

Each non-porous hydrogen electrode 31 is connected through a conductor 44 to the terminal 5 provided in the heating device 7 and each porous oxygen electrode through a conductor 45 to the other terminal 6.

The electrolytic solution chamber 33 is filled with an alkali-resistant fibrous matrix such as glass fibres, asbestos and nylon fibres which is impregnated with an electrolytic solution.

In operation, methanol is introduced into the methanol chamber 13 and the heat retaining vessel 2 is heated to 60 to 120° C., preferably to temperatures of about 80° C., by an appropriate heating means, for example, by introducing heated gas into the heating vessel 7 through the heated gas inlet 3. Thus the methanol chamber 13 is vaporised, and vapours are transferred through the pipe line 15 to the hydrogen generating means 16.

With the hydrogen generating means 16, the methanol vapours pass through the spiral pipe 19 heated by the burner 22 installed within the cylindrical body 15 and are decomposed in the meantime by being brought into contact with the palladium black catalyst deposited on the inner surface of the spiral pipe 19, thus producing hydrogen and carbon monoxide. This reaction of decomposing methanol will be effectively carried out when the methanol vapours contact the catalyst at temperatures of about 300 to 350° C. Beyond 350° C., by-product methane will be produced in increasing proportions, reducing the generation of hydrogen accordingly. The hydrogen produced by the subject reaction permeates by diffusion through the walls of the spiral pipe 19 permitting such permeation and reaches the free space within the shell 17 surrounding the spiral pipe 19. While penetrating through the pipe, part of the hydrogen which still remains in a nascent state is brought into contact with the mixed black catalyst and formed into stable hydrogen molecules.

The hydrogen gas within the shell 17 then flows through the pipe line 8 into the hydrogen chamber 31 of the cell body 1. The pressure of the hydrogen gas in the hydrogen chamber is indicated by the pressure gauge 23 disposed to the pipe line 8.

Carbon monoxide, the other product of catalytic decomposition of methanol, is separated from the hydrogen and remains in the spiral pipe 19 and transferred at the controlled flow rate through the pipe line 20 to the burner 22, where it is burnt to heat the cylindrical body 18 and enters the heating device 7 through the inlet 3 and continues to flow through the heating device 7 while heating the heat retaining vessel 2 from its circumferential walls, and is finally released from the system through the exhaust hole 4.

On the other hand, the liquid oxygen contained in the liquid oxygen vessel 25 is vapourised by being heated in the heat exchanger 24. The oxygen gas thus evolved is conducted through the pipe line 9 to the oxygen chamber of the cell body 1. The flow rate of oxygen gas to the oxygen chamber is required for the reason discussed later to be in excess of the amount of oxygen consumed by the reaction at the oxygen electrode.

In the cell body, the hydrogen gas supplied to the hydrogen chamber 31 carries out a known reaction with the electrolytic solution at the surface of the non-porous hydrogen electrode 32 positioned adjacent to the hydrogen chamber 31. On the other hand the oxygen gas supplied to the oxygen chamber 35 also carries out a known reaction with the electrolytic solution at the surfaces of the porous oxygen electrode 34. As a result of reactions at these electrodes, an electromotive force is created between them and at the same time water is produced in the electrolytic solution. The water thus produced permeates in the vapour phase through the oxygen electrode and is entrained in the form of vapour with the oxygen gas flowing through the oxygen chamber 35. If the same amount of water as that produced by the electrode reaction is removed from the surface of the oxygen electrode 34, the concentration of the electrolytic solution will obviously be maintained constant. The evaporating rate of the water depends on the flow rate of the oxygen gas stream running along the surface of the oxygen electrode 23 and the temperature of the water and oxygen gas to be removed. A suitable temperature for satisfactory operation of the fuel cell is generally within the range of from 60 to 120° C., at these conditions water will be evaporated and removed with the same amount of water as that produced in the electrolytic solution when oxygen gas is supplied in volumes about 3 to 8 times those consumed in the reaction.

The oxygen gas which has been moistened due to part of the gas consumed in the electrode reaction being replaced by vapour is conducted through the penetrating bore 43 of the packing 42 to the pipe line 10, and, while passing through the heat exchanger 24, is reduced in temperature by heating the oxygen supplied from the liquid oxygen vessel 25. By this cooling the vapour contained in the moistened oxygen gas is condensed, the condensed water is separated from the oxygen gas while passing through the trap 26. The oxygen gas thus dehumidified is supplied by the blower 27 for reuse. After the cell operation has attained the normal conditions it is only required to supply oxygen gas equal to the amount consumed by the reaction from the liquid oxygen vessel 25.

Where the oxygen gas to be supplied contains other gases, the supply of said gas mixtures is determined in such a manner that at least required amounts of oxygen for the electrode reaction are supplied and that the removal of water is fully effected. Since, in such a case, the gas released from the oxygen chamber contains reduced proportions of oxygen, it may be wasted. If atmospheric oxygen is used for supply to the fuel cell it will be possible to eliminate an equipment to store pure oxygen.

When hydrogen gas is charged into the hydrogen chamber at a pressure of one atmosphere, pure oxygen is continuously supplied to the oxygen chamber in amounts eight times those consumed in the electrode reaction and operation is carried out at a temperature of 80° C., then the output from each element cell will be 100 ma./cm.$^2$ and 84 mw./cm.$^2$ at a voltage of 0.84 v. This is a much larger value than the output of 10 to 12 mw./cm.$^2$ obtained with the same type of prior art fuel cell. When the fuel cell of the present invention is in normal operation requirements of methanol to produce an output of 15 kwh. will be about 6 litres. The capacity of a vessel to hold these amount of methanol will be only about one seventh of that of a vessel to contain sufficient amounts of hydrogen gas to produce the same output.

What is claimed is:

1. In a fuel cell comprising a cell body consisting of; at least one element cell, containing a hydrogen chamber to hold hydrogen gas; a catalyst-carrying nonporous hydrogen electrode, disposed to contact the hydrogen chamber and allowing hydrogen gas to permeate therethrough; an electrolytic solution chamber, to contain an electrolytic solution contacting the side of the hydrogen electrode opposite to that which contacts the hydrogen chamber; a catalyst-carrying porous oxygen electrode, disposed in a position parallel to the hydrogen electrode and allowing oxygen gas to permeate therethrough; an oxygen chamber to hold gas contacting the side of the oxygen electrode opposite to that which contacts the electrolytic solution chamber; supply means to supply hydrogen gas to said hydrogen chamber of said cell body; and, a mechanism to supply oxygen gas to the oxygen chamber of the cell body, the improvement therein wherein:

(a) said hydrogen electrode carries a catalyst of palladium black on the side adjacent to said hydrogen chamber and a catalyst of mixed black on the side adjacent to said electrolytic solution chamber which comprises an alloy selected from the group consisting of palladium-platinum, palladium-rhodium and palladium-platinum-rhodium alloys, said hydrogen electrode being composed of a metallic material selected from the group consisting of palladium and alloys of palladium and the elements from Group Ib in the Periodic Table;

(b) said electrolytic solution chamber is packed with a matrix consisting of alkali-resistant fibrous material impregnated with an electrolytic solution;

(c) said oxygen electrode consists of an alkali-resistant metal screen carrying a catalyst consisting of black of metal selected from the elements from Group VIII in the Periodic Table and having thin porous films facing the oxygen chamber; and (d) said supply means is a hydrogen generating means which comprises an airtight vessel having a pipe line communicating with said hydrogen chamber, a cylindrical body penetrating through said vessel, a pipe spirally provided outside the circumferential surface of the cylindrical body, which carries on the inner surface a catalyst effective for catalytic decomposition of methanol and is capable of allowing hydrogen gas to permeate therethrough, a pipe line to supply methanol to one end of the spiral pipe, a pipe line connected to the other end of the spiral pipe to remove reaction products produced therein, and a burner positioned within the cylindrical body and connected to the exhaust pipe line.

2. The fuel cell according to claim 1, wherein said cell body is housed in a vessel disposed above the hydrogen generating means so as to introduce into the vessel the exhaust combustion gas produced in the hydrogen generating means.

3. The fuel cell according to claim 2, wherein said cell body has a chamber to contain methanol surrounding said cell body.

4. The fuel cell according to claim 3, wherein said chamber to contain methanol has a pipe line connected to the hydrogen generating means to conduct methanol vapours thereto.

References Cited

UNITED STATES PATENTS

| | | | |
|---|---|---|---|
| 3,092,517 | 6/1963 | Oswin | 136—86 |
| 3,179,500 | 4/1965 | Bowen et al. | |
| 3,321,333 | 5/1967 | Palmer | 136—86 |
| 3,328,204 | 6/1967 | Grubb | 136—86 |
| 3,350,226 | 10/1967 | Lieb et al. | 136—86 |
| 3,350,229 | 10/1967 | Justi | 136—86 |
| 3,393,098 | 7/1968 | Hartner et al. | 136—86 |
| 3,402,078 | 9/1968 | Spacil | 136—86 |
| 3,432,355 | 3/1969 | Niediach et al. | 136—86 |

OTHER REFERENCES

Astia, AD 248,428, March 1961, pp. 24, 25.

ALLEN B. CURTIS, Primary Examiner